Figure 1:
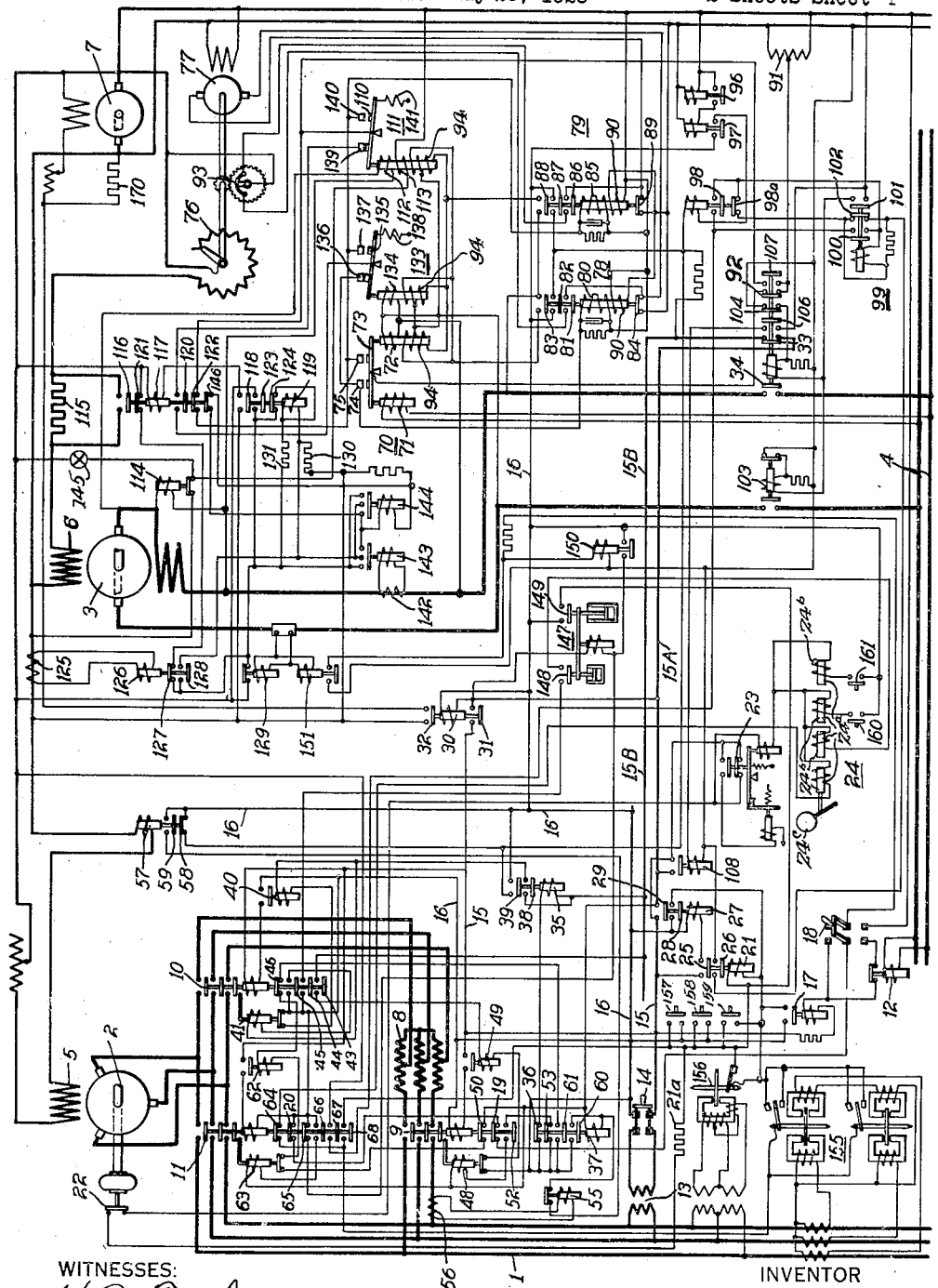

March 1, 1927.  
C. A. BUTCHER  
AUTOMATIC STATION  
Filed May 28, 1923  
1,619,459  
2 Sheets-Sheet 1

WITNESSES:  
H. B. Funk  
J. E. Foster

INVENTOR  
Charles A. Butcher.  
BY  
Wesley L. Carr  
ATTORNEY

March 1, 1927.

C. A. BUTCHER 1,619,459

AUTOMATIC STATION

Filed May 28, 1923

2 Sheets-Sheet 2

WITNESSES:

INVENTOR
Charles A. Butcher
BY
ATTORNEY

Patented Mar. 1, 1927.

1,619,459

UNITED STATES PATENT OFFICE.

CHARLES A. BUTCHER, OF EAST PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed May 28, 1923. Serial No. 641,868.

My invention relates to automatic stations and particularly to protective and control systems for controlling translating apparatus such as motor generator units in such stations.

One object of my invention is to provide a protective system for a synchronous motor-generator set whereby non-synchronous operation of the motor may be detected to protect the motor from overheating by reason thereof.

Another object of my invention is to provide means whereby the excitation of the generator may be quickly controlled to limit the voltage thereof, depending upon the operating condition of the motor.

Another object of my invention is to provide a system whereby the excitation of the generator may be controlled according to a predetermined condition of the load circuit to preclude a tendency for the current to reverse through the generator.

Another object of my invention is to provide a control system whereby the load upon the generator may normally be maintained below a predetermined maximum value but a relatively larger value of current permitted to traverse the generator, when it first assumes a portion of the load, while the temperature of the windings of the machine is less than the predetermined value.

These and other objects will appear more fully from a consideration of the system described in connection with the accompanying drawings.

In practicing my invention, I provide a current transformer in circuit with the field winding of the synchronous motor to energize a relay when the motor is pulled out of synchonism by reason of an excessive load thereon. During normal operation, the relay will, of course, not be energized. In order to quickly reduce the load upon the generator to permit the motor to return to synchronous operation, I dispose a resistor in circuit with the field winding of the generator to reduce the voltage thereof. Normally, the resistor is short-circuited. Upon the occurrence of predetermined abnormal conditions, such as the motor being pulled out of synchronism because of load thereon, the short-circuiting means is rendered ineffective and the resistor becomes effective to limit the excitation of the generator field winding.

In order to protect the generator from overheating, I provide a thermal relay that reproduces the thermal conditions in the generator windings. A regulator is also provided to control the voltage of the generator to preclude more than a predetermined value of current from being supplied thereby to a load circuit. However, inasmuch as the temperature of the generator, when first connected to the system, is relatively low and it is capable of a sustained overload for the interval of time during which the temperature of the generator gradually attains the desired maximum operating temperature, I provide means for modifying the controlling effect of the regulator to the extent that it will permit a greater load upon the generator while the temperature thereof is below the predetermined operating value. When such temperature is attained, the modifying means is rendered ineffective and the regulator then operates to maintain the generator current below the predetermined maximum value.

In automatic substations containing apparatus that may be connected automatically to a system upon a demand for energy, or disconnected when such demand ceases, protective devices of different kinds, that are responsive to different conditions, are provided to protect the apparatus from such abnormal conditions. Some of such protective devices are arranged merely to disconnect the apparatus from the system temporarily, and to permit a subsequent automatic reconnection. Other protective devices, however, are arranged to lock out the apparatus to preclude further automatic connection to the system until the faulty condition has been cleared or eliminated and the protective devices manually reset by an attendant.

In view of the number of such devices that may be employed to lock out the apparatus to preclude further automatic connection thereof to the system, it is desirable to provide means that will indicate which of the protective devices operated to disconnect the apparatus, when the station is subsequently inspected. I therefore provide an annunciator relay which is operated by any one of the predetermined lockout protective devices to preclude further automatic operation of the station and, at the same time, to indicate which of the protective devices effected its operation.

Figure 2:
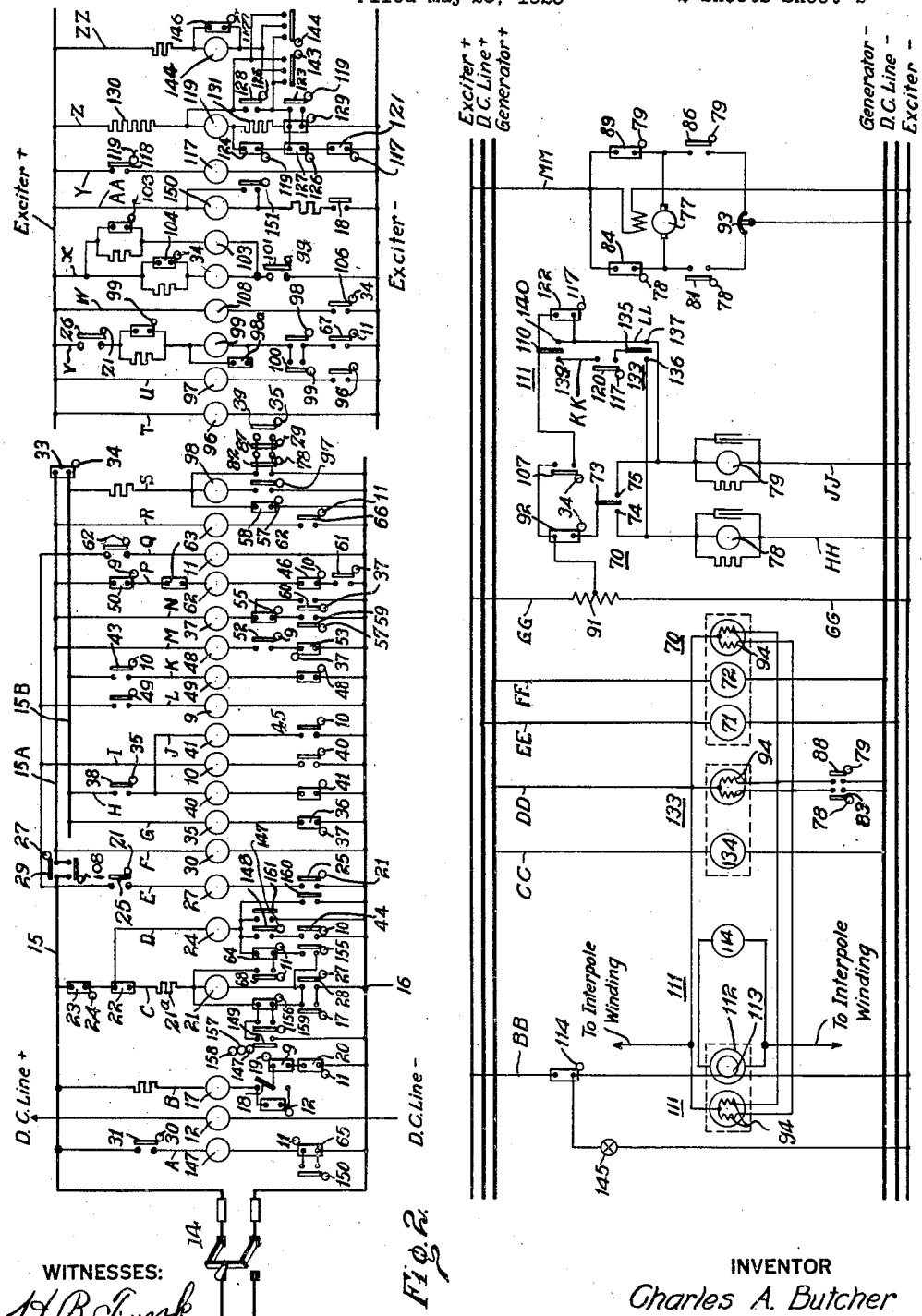

Figure 1 of the accompanying drawing is a diagrammatic view of an electrical system containing apparatus arranged to operate in accordance with my invention, and Fig. 2 is a schematic diagram illustrating, in simplified form and arrangement, the respective circuits of the various operating devices.

Referring to Fig. 1 of the accompanying drawings, alternating-current energy is derived from a source 1 of alternating-electromotive force and translated to direct-current energy, by means of a synchronous motor 2 and a direct-current generator 3, which is then supplied to a direct-current circuit 4. The synchronous motor 2 is provided with a field winding 5 and the generator 3 is provided with a field winding 6. Energy for these windings is supplied by an exciter generator 7.

A plurality of auto-transformers 8, that are energized from the circuit 1 through a switch 9, are employed to provide a relatively small starting potential for the motor 2, which is applied thereto through a starting switch 10. After the motor is accelerated to synchronous speed, the switches 9 and 10 are opened to remove the starting voltage from the motor 2, and a running switch 11 is closed to impress normal operating voltage upon the motor.

The initiation of the operation of the system is effected by means of a voltage relay 12 which is responsive to the voltage of the direct-current circuit 4 and serves to indicate a demand for energy thereon. Control energy for operating the various control devices, before the unit is accelerated to sufficient speed to provide energy from the exciter, is procured from the circuit 1 through a transformer 13 and is supplied through a manually-operated switch 14 to two control conductors 15 and 16.

When the relay 12 closes, by reason of low voltage on the circuit 4, a circuit is completed to energize a relay switch 17, as illustrated in circuit B in Fig. 2, from the control conductor 15 through the resistor and operating coil of the relay switch 17, the relay switch 12, a manually-operable switch 18 in its lower position, an interlock switch 19 of the transformer switch 9 and an interlock switch 20 of the running switch 11 to the other control conductor 16. The switch 17 is thereupon closed.

Switch 17, in closing, completes the circuit of the operating coil of a master relay switch 21. This circuit may be traced, as illustrated in circuit C of Fig. 2, from control conductor 16 through switch 17, operating coil of relay 21, a resistor 21*, an overspeed switch 22, a switch 23 of an annunciator and lock-out relay 24 to the other control conductor 15. The relay 21 is thereupon energized to close its two switches 25 and 26.

The switch 25, upon closing, connects the operating coil of a relay switch 27 between the control conductors 15 and 16, as illustrated in circuit E in Fig. 2. The relay 27 thereupon closes its two switches 28 and 29. Switch 28 is connected in parallel with the relay switch 17 and serves to maintain a holding circuit thereafter for the relay 21, irrespective of fluctuations in the operation of the relay 12, which might otherwise, consequently, cause fluctuations in the operation of relay 17. The switch 29, when closed, connects the control conductor 15 to an auxiliary control conductor 15—A.

The various protective devices associated with the station are disposed to render the relay 21 and, consequently, the relay 27 ineffective, thereby effecting the deenergization of the auxiliary control conductor 15—A to permit the various control devices energized therefrom to be immediately deenergized.

Immediately after the energization of the auxiliary control conductor 15—A, a relay switch 30 is energized between the conductor 15—A and the conductor 16, as illustrated in circuit F shown in Fig. 2. The relay switch 30, upon being energized, closes its switches 31 and 32.

Simultaneously with the energization of the auxiliary control bus conductor 15—A, a second auxiliary control bus conductor 15—B is energized from the conductor 15—A through back interlock switch 33 of one of the main direct-current switches 34 for connecting the generator to the direct-current circuit 4.

At the same time that the relay switch 30 is energized, another relay switch 35 is energized between the second auxiliary bus conductor 15—B and the conductor 16 through an interlock switch 36 of a transfer relay 37, as illustrated in circuit G. The relay 35 thereupon closes its two switches 38 and 39. The switch 39, while closed, serves to preclude premature connection of the generator to the direct-current circuit, in a manner to be hereinafter described.

The switch 38, upon closing, completes the energizing circuit of a relay switch 40, through the back interlock switch of a holding relay 41, between the control conductors 15—B and 16, as is illustrated in circuit H. The closing coil of the starting switch 10 is thereupon connected between the control conductors 15 and 16, as illustrated in circuit I, to close the starting switch 10. The switch 10, while closing its main contacts, closes three front interlock switches 43, 44 and 45 and opens a back interlock switch 46.

The interlock switch 45, when closed, cooperates with the switch 38 of the relay switch 35, as is illustrated in circuits H and J, to connect the operating coil of the holding relay 41 between the control conductors 15—B and 16. The starting switch 10 is thereupon held in closed position by the holding relay 41 and the closing coil is deenergized upon the consequent deenergization of the closing-coil relay 40 by the back interlock switch of the holding relay 41.

The interlock switch 43 of the starting switch 10, upon being closed, cooperates with the interlock switch of the holding relay 48 associated with the transformer energizing switch 9 to connect a relay 49, associated with the closing coil of switch 9, between the control conductors 15—B and 16, as is illustrated in circuit K in Fig. 2. The relay 49 thereupon connects the closing coil of switch 9 to the control conductors 15 and 16, as illustrated in circuit L, and the switch 9 is closed.

When the main contacts of switch 9 are closed, two interlock switches 19 and 50 are open and an interlock switch 52 is closed. As illustrated in circuit M, the switch 52, when closed, cooperates with a back interlock switch 53 of the transfer relay 37 to connect the operating coil of the holding relay 48 between the conductors 15—A and 16, thereupon energizing the holding coil 48 to maintain the switch 9 closed. The closing coil of the switch 9 is thereupon deenergized.

Reduced starting electromotive force is now impressed on the motor 2 which is gradually accelerated to synchronous speed. The transfer from relatively small starting voltage to normal operating voltage is effected when the starting current decreases to a predetermined minimum value and when the field winding of the motor subsequently becomes energized to a predetermined degree, thus checking, by different electrical conditions, the attaining of synchronous speed. The condition of minimum starting current is indicated by a current relay 55 which is energized by a current transformer 56 in accordance with the starting current. The energization of the field winding of the motor is indicated by a relay 57 that is connected in series therewith and that operates, when energized to a predetermined degree, to open a back interlock switch 58 and to close a front interlock switch 59.

When both the starting current relay 55 and the field current relay 57 are energized to predetermined degrees, the current relay switch 55 will cooperate with the switch 59 of the field relay to connect the operating coil of the transfer relay 37 between the conductors 15—A and 16, as illustrated in circuit N. The transfer relay 37 is thereupon operated to open its back interlock switches 36 and 53 and to close two front interlock switches 60 and 61.

Switch 60, when closed, serves to maintain a holding circuit for the relay 37 by connecting the coil between the conductors 15—A and 16, as illustrated in circuit N.

Immediately upon the operation of the transfer relay 37, the back interlock switch 36 opens to deenergize the operating coil of the relay 35 (circuit G). Interlock switches 38 and 39 of the latter relay are thereupon opened. Switch 38, in opening, deenergizes the holding relay 41 of the starting switch 10 which permits the latter to open (circuits H and J). Simultaneously, the opening of the interlock switch 53 by the transfer relay 37 deenergizes the holding relay 48 (circuit M) associated with the transformer energizing switch 9. The auto-transformers 8 are thereupon disconnected from the circuit and the starting voltage removed from the motor 2.

Immediately upon the opening of starting switch 10 and the subsequent closing of its interlock switch 46, the circuit of the closing coil relay 62 associated with the running switch 11 is energized, as is illustrated in circuit P, from the control conductor 16, through the front interlock switch 61 of the transfer relay 37, the back interlock switch 46 of the starting switch 10, the operating coil of the relay 62, the interlock switch of a holding relay 63 and the back interlock switch 50 of the transformer-energizing switch 9 to the other control conductor 15—A.

The relay 62 thereupon energizes the closing coil of the running switch 11 to close the latter (circuit Q), whereupon the back interlock switch 20 and two other back interlock switches 64 and 65 are opened and three front interlock switches 66, 67 and 68 are closed. Switch 66 completes the energizing circuit of the holding relay 63, as shown in circuit R, to hold the switch 11 closed. Full operating voltage is now applied to the synchronous motor 2 and it continues to operate until otherwise controlled by the protective devices, as will be hereinafter explained.

The back interlock switch 20 of the running switch 11 and the back interlock switch 19 of the transformer-energizing switch 9 serve, when open, to disconnect the relay 17 from the energizing control circuit, since that relay is no longer needed (circuit B).

The motor is now operating at synchronous speed and the exciter voltage gradually increases, energizing the motor and the generator field windings. Since the voltage of the direct-current circuit 4 to which the generator is to be connected may vary considerably from the normal operating voltage, it is desired to regulate the voltage of the generator until it corresponds to the voltage of the direct-current circuit before the generator is connected thereto.

For this purpose, a voltage regulator 70 is provided comprising two differentially operating and balancing coils 71 and 72, a balanced member controlled thereby and a movable contact member 73 controlled by the balanced member to engage either of contact members 74 and 75, depending upon the relative excitation of the coils 71 and 72. The coil 71 is energized from the direct-current circuit 4 and the coil 72 is energized from the direct-current generator 3. The movable contact member 73 will therefore be disengaged from the contact members 74 and 75 only when the voltage of the generator is equal to the voltage of the direct-current circuit 4.

The voltage of the generator is regulated by means of a motor-operated rheostat 76 that is connected in circuit with the field winding 6 of the generator across the terminals of the exciter 7. The rheostat 76 is controlled by a reversible motor 77 (circuit MM), the filled winding of which is normally energized in one direction from the exciter 7 and the armature of which is controlled by two switching devices 78 and 79 that are operative, respectively, to effect the raising and the lowering of the generator voltage.

The voltage-raising switch 78 comprises an operating coil 80, three front interlock switches 81, 82 and 83, that are closed when the switch is operated, and a back interlock switch 84 that is opened by the operation of the switch. The voltage-lowering switch 79 similarly comprises an operating coil 85, front interlock switches 86, 87 and 88 that normally are open and are closed by the operation of the switch 79, and a back interlock switch 89 that is normally closed but is open when the switch 79 operates. The switches 78 and 79 also comprise holding coils 90 that are constantly energized and serve to maintain the relays 78 and 79 positively in their respective open positions when the operating coils are deenergized.

While the generator voltage gradually increases, the excitation of the line-excited coil 71 may exceed that of the generator-excited coil 72 and the contact members 73 and 74 will engage. Under such conditions, a circuit is completed to energize the operating coil of the voltage-raising switch 78. This circuit may be traced from the mid-point of a resistor 91 (circuit GG), that is energized from the exciter terminals, through (circuit HH) a back interlock switch 92, that is closed in the open position of the direct-current circuit breaker 34, through the contact members 73 and 74 of the regulator 70 and the operating coil 80 of the voltage-raising switch 78 to the negative terminal of the exciter. The voltage-raising switch 78 is thereupon energized to close its interlock switches 81, 82 and 83.

The switch 81, in closing, permits current to traverse the armature of the rheostat motor 77 in such direction as to remove the effective rheostat resistance from the circuit of the shunt field winding of the generator. This circuit may be traced from the negative terminal of the exciter through the limit switch 93 associated with the rheostat, the interlock switch 81 of the raising switch 78, the armature of the motor 77 and the interlock switch 89 of the voltage-lowering switch 79 to the positive terminal of the exciter.

While the generator voltage is gradually increasing, the switch 83 completes the energizing circuit for the upper anti-hunting coil 94 which tends to cooperate with the coil 71 in such manner as to establish an artificial balancing effect slightly before the generator voltage actually attains the value of the voltage of the direct-current circuit.

If the generator voltage should increase beyond the value of the voltage of the direct-current circuit, the contact member 73 of the regulator would disengage the contact member 74 and would engage the contact member 75. The voltage-raising switch 78 would thereupon be permitted to return to its initial position and the voltage-lowering switch 79 would become energized (circuit JJ) to close its interlock switches 86, 87 and 88. Switch 86 would then complete the circuit of the armature of the rheostat motor in a reversed direction, to insert resistance in the circuit of the generator field winding, this circuit being traced from negative exciter through limit switch 93, interlock switch 86 of lowering switch 79, the armature of rheostat motor 77, and interlock switch 84 of the voltage-raising switch 78 to positive terminal of the exciter. The interlock switch 88 serves to complete the circuit for the lower anti-hunting coils 94.

When the voltage of the generator corresponds to the voltage of the direct-current circuit 4, the contact member 73 will be disengaged from both contact members 74 and 75 and the raising and lowering switches 78 and 79 will be in their respective deenergized positions. Under such conditions, the generator will then be connected to the direct-current circuit in the following manner.

When the voltage of the exciter was developed, a polarity relay 96, as illustrated in circuit T, closed its switch to energize a voltage relay 97 from the exciter. The relay 97, as illustrated in circuit U, closed, when energized to a predetermined degree, to connect the operating coil of a relay 98 between the conductors 15—B and 16, as is illustrated by the middle portion of circuit S, The operating coil of relay 98 remained deenergized, however, while the raising and lowering switches 78 and 79 were being operated to regulate the generator voltage, by reason of the interlock switches 82 and 87 short-circuiting the operating coil of relay 98, as may be seen by referring to the right-hand portion of circuit S.

Moreover, the relay 98 was precluded from operating even after the exciter had developed a predetermined voltage, so long as the voltage to be applied to the motor had not been transferred from starting to running value, by reason of the switch 39 of the relay 35 being in closed position to short-circuit the operating coil of the relay 98. The relay 35 is otherwise employed to control the starting switch 10.

Still another switch, namely, the interlock switch 58 of the motor field relay 57, short-circuited the operating coil of the relay 98 to preclude its energization until the motor field was sufficiently energized to permit the motor to assume the normal operating load that would be placed upon it in operating the generator.

These precautions, in precluding the excitation and operation of the relay 98, are taken to prevent the connection of the generator to the direct-current circuit until various conditions in the motor and in the generator are attained, indicating normal operating conditions.

After the proper energization of the motor field winding and the subsequent transfer from starting to running voltage, and the development of proper electro-motive force by the generator, the relay 98 is permitted to be energized and to close its switch.

The switch of the relay 98 cooperates with the interlock switch 67 of the running switch 11, as is illustrated in circuit V, and the switch 26 of the master relay 21 to connect the operating coil of a relay switch 99 between the terminals of the exciter. The relay 99 is thereupon energized to close two front interlock switches 100 and 101 and open a back interlock switch 102.

The interlock switch 102 is merely effective to insert a limiting resistor in circuit with the operating coil 99 to limit the current traversing the operating coil to a value which is sufficient to hold the relay in closed position, but not sufficient to operate it. The switch 100, when closed, parallels the relay switch 98 to maintain a holding circuit for the relay 99.

The switch 101, in closing, connects the closing coils of the direct-current circuit interrupters 34 and 103 to the terminals of the exciter to energize the former, and the interrupters are thereupon closed to connect the generator to the direct-current circuit 4.

The interrupter 34, upon closing, opens its back interlock switches 33 and 92 and another interlock switch 104, and closes two front interlock switches 106 and 107. The switch 104 serves merely to insert a current-limiting resistor in circuit with the closing coil to limit the current that may traverse the same to a value that is sufficient to hold the interrupter closed.

The switch 33, in opening, disconnects the second auxiliary control bus 15—B from the first control bus 15—A, whereupon the relay 98 is deenergized. As previously explained, however, the relay 99 maintains its own holding circuit to retain the interrupters 34 and 103 in closed positions.

The switch 106, of the interrupter 34, when closed, energizes a relay switch 108 (circuit W) which serves, when energized, to close its switch to provide an additional current-carrying path between the main control conductor 15 and the auxiliary control conductor 15—A.

When the interlock switch 92 of the interrupter 34 is opened, operating control is removed from the movable contact member 73 of the voltage regulator 70 and the latter is rendered ineffective so long as the generator is connected to the direct-current circuit. The closing of the switch 107, however, impresses voltage upon a movable contact member 110 of a current regulator 111. The current regulator 111 thus becomes operative to control the voltage of the generator only after the generator has been connected to the direct-current circuit 4 and controls the generator voltage to preclude more than a predetermined value of current from being supplied to the circuit by the generator during normal operation.

The normal operating coil 112 of the regulator 111 is energized from a portion of the generator winding that serves as a shunt to energize said coil in accordance with the current traversing the generator. The regulator is adjusted to prevent the generator current from exceeding a predetermined value, by decreasing the voltage of the exciter field when the load upon the generator increases and tends to draw more current from the generator.

Since the reason for limiting the current to a predetermined maximum value is to avoid overheating of the generator windings, it will be realized that, when the generator commences operation, more than such maximum value of current may be permitted to traverse the generator windings until the dangerous temperature is attained.

In order to permit the generator to assume more than its share of load, while the temperature of the generator windings is considerably below the dangerous temperature, I provide an auxiliary winding 113 which serves to so modify the controlling effect of the current regulator 111 as to establish an artificial condition indicating a current of lesser value to be traversing the generator.

When the temperature of the generator attains a predetermined value beyond which it is desired to avoid overheating the machine, a thermal relay 114 becomes operative to deenergize the modifying winding 113 (circuit BB), which had been heretofore energized from the exciter. The relay 114 may be arranged to have a temperature characteristic corresponding directly to that of the generator, in order to provide ideal protection, or it may be adjusted merely to provide a sufficient time element to protect the generator from overheating. Since the relay is connected across the terminals of a series winding of the generator, it will operate in response to the potential drop across that winding, which will be a function of the temperature thereof.

During the regulation of the generator 3 while its voltage is permitted to increase, a resistor 115, that is disposed in the circuit of the shunt field winding 6 of the generator, is short-circuited by a switch 116 of a relay switch 117. The operating coil of the relay switch 117 is maintained energized by an interlock switch 118 of a relay 119 (circuit Y), when the exciter voltage attains a predetermined value.

The relay device 117 comprises, in addition to the interlock switch 116, a front interlock switch 120, that is normally open, and three back interlock switches 121, 122 and 146. The relay 119 comprises, in addition to the switch 118, a front interlock switch 123 and a back interlock switch 124.

During normal operation, the relay 117 is energized to short-circuit the resistor 115 to permit the current regulator 111 to control the voltage of the generator depending upon the load thereon. Upon the occurrence of abnormal conditions, such as the motor pulling out of synchronism by reason of heated bearings or other overloading conditions, it is desired to deenergize the relay 117 to permit the resistor 115 to become effective to reduce the excitation of the generator quickly.

In order to detect non-synchronous operation of the motor, I dispose a current transformer 125 in the circuit of the motor field winding and provide a relay switch 126 to be energized from the current transformer. The relay switch 126, when energized, opens a back interlock switch 127 and closes a front interlock switch 128 which cooperates with the switch 123 of the relay 119 to shunt the coil of the relay 119 and, consequently, effect the deenergization of the resistor-controlling relay 117.

An additional relay 129, that is responsive to the current that traverses the generator, is provided to cooperate with the slip detecting relay 126 in controlling the resistor-controlling relay 117. The relay 129 is arranged to close its contacts when the current traversing the generator decreases to or below the value corresponding to about one-fourth of full load value.

Upon referring to circuit Z, the energizing circuit for the operating coil of the relay 119 may be more readily traced and the operation of that relay more easily comprehended. When the exciter voltage attains a predetermined value, the relay 119 is energized by a circuit proceeding from the positive terminal of the exciter through a resistor 130, the operating coil of the relay 119, its interlock switch 124 and a limiting resistor 131 in parallel, thence through either of two paths, one of which includes the back interlock switch 127 of the relay 126 and the back interlock switch 121 of the relay 117 to the negative terminal of the exciter; the other path comprising the switch of the generator current-responsive relay 129 and a connection to the negative terminal of the exciter.

Therefore, as soon as the exciter voltage attains a value that is sufficient to energize the relay 119 to effect the operation thereof, it is actuated to its energized position, thereupon energizing the relay 117 to short-circuit the resistor in the generator field circuit. In the energized position of the relay 119, its front interlock switch 123 is closed to maintain its own holding circuit.

If, now, some condition arises which pulls the motor out of synchronism, the relay 126 will become energized, and, after an interval depending upon its time setting, will close its front interlock switch 128. As will be seen by referring to circuit Z, the switch 128, when closed, short-circuits the operating coil of the relay 119, thereby deenergizing it and permitting it to return to its initial position. The relay 117 is also thereupon deenergized and the resistor 115 is rendered effective to reduce the excitation of the field winding of the generator.

Since the current supplied by the generator to the circuit 4 has undoubtedly exceeded the operating value of the current relay 129, which is adjusted to approximately one-fourth of the generator capacity, its switch will be in its open position. As the current traversing the generator gradually decreases to a value corresponding to the setting of the current relay 129 by reason of the diminished field excitation, the relay switch 129 closes. The short-circuit across the operating coil of the relay 119 will be maintained by the interlock switch 128 of the slip relay 126 so long as the motor is operating non-synchronously.

However, as soon as the resistor 115 becomes effective to limit the excitation of the field winding, and the load eventually decreases to a value which permits the current relay switch 129 to close, the motor is able to reassume the load and again attain synchronous speed. Under such conditions, the front interlock switch 128 of the slip relay 126 is opened and, after a time interval, the switch 127 of the relay is closed.

If the load upon the generator has decreased to such value as would permit closing of the current relay switch 129, the relay 119 will be energized as soon as the front interlock switch 128 of the slip relay 126 opens. If the motor should reattain synchronous speed, however, at a value exceeding the load value at which the current relay is adjusted to close, the relay 119 would become energized after a relatively short interval required for the back interlock switch 127 of the slip relay to reclose. The resistor-controlling relay 117 would thereupon be immediately reenergized and the resistor 115 short-circuited to permit the gradual assumption of the load by the generator.

In order to maintain the voltage of the generator substantially constant during normal operation, while the load thereon is less than the predetermined maximum value, a third regulator 133 is provided to control the excitation of the generator in the same manner as the other regulators 70 and 111 are arranged to control the excitation thereof, namely, by means of the rheostat 76 and the voltage-raising and voltage-lowering switches 78 and 79. The regulator 133 comprises an operating coil 134, a movable contact member 135, and two stationary contact members 136 and 137 that are respectively adapted to be engaged by the contact member 135, depending upon the relative degree of energization of the operating coil 134 relative to the adjustment of a tension spring 138.

The regulators 111 and 133 are also provided with anti-hunting coils 94 similar to those mentioned in connection with the regulator 70. The operation of this device is set forth in a copending application of Roy J. Wensley, for voltage regulator systems, filed August 28, 1922, Serial No. 584,613, and assigned to the Westinghouse Electric & Manufacturing Company.

The current load regulator 111, which cooperates with the regulator 133 to maintain the current below a predetermined maximum value while the temperature of the generator exceeds a predetermined value, is provided with two contact members 139 and 140 which are adapted to be respectively engaged by the movable contact member 110, depending upon the effective torque of the two windings 112 and 113, and of the winding 112 when it alone is energized, relative to the tension of a spring 141.

As may be seen by referring to circuits GG and HH, only the voltage regulator 70 is effective before the generator is connected to the direct-current circuit to regulate the voltage of the generator to correspond to that of the circuit, by reason of the interlock switch 92 being closed and the switch 107 open.

After the generator is connected to the circuit, the control voltage that is derived from the resistor 91, that is connected between the exciter terminals, is transferred by the interlock switch 107 of the direct-current interrupter 34 to the regulators 111 and 133. Their operation then depends upon the load on the generator and upon the operation of the resistor-controlling relay 117.

During normal operation, when the resistor-controlling relay 117 is energized, the switch 122 of the relay 117 is open. Assuming that the operating temperature of the generator has been attained and that the modifying coil 113 has been open-circuited, the regulator 111 will operate, to control the voltage of the generator, depending upon the load thereon.

Normally, the load will be less than the maximum value for which the current regulator 111 is adjusted. The contact member 110 will therefore engage the contact member 139 and impress control potential upon the movable contact member 135 of the voltage regulator 133, from the resistor 91 through the interlock switch 107 of the interrupter 34, the contact members 110 and 139 of the current regulator 111 and the interlock switch 120 of the resistor-controlling relay 117. The voltage regulator 133, under such conditions, will be effective to control the excitation of the generator field winding by controlling the voltage-raising and the voltage-lowering switching devices 78 and 79 to operate the rheostat 76. Thus, so long as the current does not exceed the maximum value, the voltage regulator 133 controls the generator voltage.

If the current should tend to exceed the normal operating load for which the current regulator 111 is adjusted, the contact member 110 will disengage the contact member 139 and engage the contact member 140. Control potential will thereupon be removed from the movable contact member 135 of the voltage regulator 133 and the current regulator 111 will operate directly to effect the lowering of the generator voltage by energizing the operating coil of the voltage-lowering switch 79 until the current decreases to the predetermined operating value and will thereafter maintain the current at that value.

As will be seen upon referring to circuit LL, the excitation of the generator is controlled independently of the regulators upon the occurrence of such abnormal conditions as effect the deenergization of the resistor controlling relay 117. As soon as that relay is deenergized, its back interlock switch 122 closes to immediately energize the voltage-lowering relay 79 to insert the resistance of the rheostat 76 in circuit with the generator field winding. As soon as the motor re-attains synchronous speed to re-assume the load, the resistor-controlling relay 117 is again energized, as explained above, and the interlock switch 122 opens to permit the regulators to become again effective in controlling the excitation of the generator.

In addition to the slip responsive relay for controlling the excitation of the generator by controlling the resistor-controlling relay 117, I provide means responsive to short-circuits only, comprising a current transformer 142 and a relay 143 that is energized thereby only upon the occurrence of a short circuit on the generator. The relay 143, when so energized, short-circuits the operating coil of the relay 119 (circuit ZZ) and the resistor controlling relay 117 is deenergized in the same manner as set forth above in connection with the slip relay 126 that is associated with the field winding of the motor.

The relay 143, being but an impulse relay, is disposed, when actuated, to energize a relay 144 which maintains its own holding circuit through the interlock switch 123 of the relay 119, as shown in circuit ZZ, until the relay 119 is deenergized and returns to its initial position.

The back interlock switch 146 of the resistor-shunting relay switch 117 short-circuits the operating coil of the relay 144 to insure its deenergization to permit the relay 119 to be reenergized.

By means of the regulator-controlled rheostat 76 and the field limiting resistor 115, I am able to procure relatively sensitive control and regulation of the generator voltage under all conditions. While conditions are such as merely to overload the generator within the capacity of the motor, the current regulator controls the voltage of the generator to permit it to supply the predetermined maximum current. Under such conditions, the voltage of the generator is decreased by the rheostatic regulator inserting resistance in the circuit of the shunt field winding.

Upon the occurrence of a short-circuit, the field resistance is inserted to quickly reduce the excitation of the generator and, simultaneously, the rheostatic regulator operates also to insert its resistance in the circuit of the generator field winding. Immediately upon the insertion of the limiting resistance in the circuit of the field winding, the short-circuiting relay switch is deenergized to permit the reenergization of the relay 119 to effect the reenergization and reclosure of the resistor short-circuiting switch 117. The switch 117 is of the contactor type which operates under the control of the relay 119 somewhat in the same manner as the Tirrill regulator. By inserting the resistor in the circuit of the generator field winding, the rheostatic regulator is given sufficient time to insert its resistance and assist in regulating the voltage of the generator, as may be necessary. The limiting resistor itself serves to wipe off the peaks of the switching surges when large amounts of load are connected to the system.

In order to indicate to a station attendant when the temperature of the machine has attained the operating value at which the current regulator 111 is to operate without the modifying effect of the winding 113, I provide an indicator, such as a lamp 145, which is controlled by the relay 114 that controls the modifying winding 113 of the regulator (circuit BB).

A single time-element relay 147 comprising two switches 148 and 149 is employed to protect the apparatus against such abnormal conditions as might preclude the transfer from starting to running conditions within a predetermined interval of time, and is also employed to disconnect the motor-generator unit from the system when the load decreases below a predetermined amount for a predetermined interval of time. The switch 148 closes about one and one-half minutes after the relay 147 is energized and the switch 149 closes about twenty to thirty minutes after the relay is energized, depending upon adjustments.

The energization of the time relay 147 is controlled by the two relays 150 and 151, as illustrated in circuits A and AA. Normally, while the load exceeds the setting of underload relay 151, the relay 150 is deenergized and its switch is maintained open. When the load decreases to a predetermined value, the load relay 151 opens its switch to permit the coil of relay 150 to be energized. The switch of the relay 150 thereupon connects the operating coil of the time relay 147 between the control conductors 15 and 16 through the switch 31 of relay 30, as illustrated in circuit A.

The switch 148 of time relay 147 closes after one and one-half minutes but since the interlock switch 44 of the starting switch 10, that is in series therewith, is open, the lockout relay 24 will not be operated (circuit D).

After an interval of the order of twenty minutes, the switch 149 of time relay 147 closes. As illustrated in the left-hand portion of circuit C, the operating coil of the master relay 21 will be short-circuited and the relay 21 deenergized. The relay devices will thereupon be controlled to effect the disconnection of the motor generator from the direct-current circuit and the alternating-current circuit in that sequence. It is essential that the generator be disconnected from the direct-current circuit before the motor is disconnected from the alternating-current circuit in order that the generator may not operate as a motor and tend to accelerate the speed.

The relay 21, upon being deenergized, opens its front interlock switch 25 which deenergizes the relay switch 27, as may be seen upon reference to the circuit E. The relay switch 27, upon being deenergized, opens its front interlock switch 29 to disconnect the auxiliary control bus 15ᵃ from the control bus 15 at that point. However, as will be seen upon referring to the schematic diagram in Fig. 2, the relay switch 108 still maintains connection between the control conductor 15 and the auxiliary control conductor 15—A.

The relay 21, upon being deenergized, also opens its front interlock switch 26, thereby deenergizing the relay 99, as may be seen upon referring to circuit V. The relay 99 in turn deenergizes the holding coils of the main direct-current switches 34 and 103 (circuit X), thereby effecting the disconnection of the generator from the direct-current circuit. The relay 108 is thereupon deenergized by the opening of the front interlock switch 106 of the direct-current switch 34 (circuit W), and the switch 108 is subsequently opened to disconnect the auxiliary control bus 15—A from the main control bus 15. The holding magnet 63 is consequently deenergized (circuit R) and the running switch 11 is permitted to open to disconnect the motor 2 from the alternating-current circuit 1. The motor generator is thus disconnected from both circuits in proper sequence, first from the direct-current circuit and then from the alternating-current circuit.

In order to render the motor-generator unit immediately available for reconnection to the system after being disconnected therefrom, it is necessary that the field windings of the generator and of the motor be immediately deenergized. Upon reference to circuit F, it will be seen that relay 30 is deenergized upon the opening of the relay switch 108 joining the control conductors 15 and 15—A. The switch 32 of relay 30 thereupon opens and permits the resistor 170 to be effective in limiting the current traversing the shunt field winding of the exciter. The exciter voltage immediately decreases and the excitation of the motor and the generator fields is correspondingly diminished.

During the starting operation, if the motor should be unable to start by reason of bearing trouble or other abnormal conditions, the switch 148 of the timing relay 147 would close and, with interlock switch 44 of the starting switch 10, would energize the operating coil of the lock-out relay 24 to effect its operation, as illustrated by the second part of circuit D. The unit would remain locked out until the abnormal conditions were cleared and the lock-out relay 24 normally reset by an attendant.

A phase-balance current relay 155 is provided to disconnect the unit from the system if the windings of the motor should become so affected as to cause a considerable unbalance between the currents traversing the several windings during operation. Under such conditions, the relay 155 would close its switch which cooperates with the inter-lock switch 68 of the running switch 11 to short-circuit the master relay 21 (circuit C).

If such conditions obtain in the motor during starting of the motor, the relay switch 155 will cooperate with the interlock switch 64 of the running switch 11 and switch 28 of relay 27 to operate the lock-out relay 24 to preclude further operation of the unit until the abnormal condition is cleared and the lock-out relay 24 reset, as is illustrated in circuit D.

Upon the occurrence of phase reversal in the alternating-current circuit, a phase relay 156 permits its switch to close to short-circuit the operating coil of the master relay 21 to preclude connection of the motor to the system while such phase reversed condition exists.

Other relay devices may be arranged to short-circuit the operating coil of the master relay upon the occurrence of such conditions as are transient in nature, as distinguished from those which are persistent and must be cleared by an attendant. For example, relay devices responsive to thermal conditions in the motor or the generator may be arranged to close switches 157 and 158, or a reverse-current relay to close a switch 159 to deenergize the master relay and disconnect the motor-generator unit from the system.

When abnormal conditions of a persistent nature occur, such as heated bearings, or open circuits in the control equipment whereby transfer from starting to running operation is precluded, protective devices may be arranged to close switches 160 and 161 to operate the lock-out relay 24. As illustrated in circuit C, the circuit of the master relay 21 is then maintained open until an attendant may visit the station to clear the trouble and reset the relay 24.

Each of several circuits, by means of any one of which the lockout relay 24 may be energized, is connected to the main operating coil of the relay 24 through a separate auxiliary coil 24a of the same relay. Each of the coils 24a is provided with an armature member 24b to which a movable annunciator member 24c is connected. Thus, when any circuit is closed to energize the main operating coil of the relay 24, the auxiliary coil 24a that is connected in series with that circuit is also energized.

When one of the auxiliary coils 24a is energized, its armature member 24b is actuated to move its annuciator member 24c to the right. Any annuciator member that is so actuated remains in such position until the relay 24 is reset manually, at which time the attendant is informed as to which circuit caused the energization of the lockout relay according to which annuciator member has been actuated. He therefore knows what kind of a fault caused the station to be locked out of service and the locating of the trouble is thereby greatly facilitated.

Recapitulating, my invention comprehends, among other general arrangements and combinations disclosed herein, the following broad principles:

1. An arrangement whereby abnormal conditions of transient and of persisting character may be distinguished and utilized to control an automatic station in different manners;

2. An arrangement whereby an attendant may be informed which of a plurality of protective devices has effected the automatic shutting down and locking out of the stations by reason of the occurrence of abnormal conditions of a persisting character;

3. An arrangement whereby non-synchronous operation of a synchronous machine may be detected to procure protection from overheating;

4. An arrangement whereby upon such non-synchronous operation of a synchronous motor, a generator driven thereby may be so controlled as to permit the motor to re-attain normal synchronous operation; and 5. An arrangement whereby a generator may be controlled normally to assume a predetermined load, but permitted, while below a predetermined temperature, to assume a greater load.

My invention is not limited to the specific apparatus that is illustrated or to the particular arrangement thereof, since they may be variously modified without departing from the spirit and scope of my invention, as set forth in the appended claims.

I claim as my invention:

1. In a power distributing system, the combination with a synchronous motor, a direct-current generator to be driven thereby and an exciter generator provided with a shunt field winding for energizing the field magnet windings of both the motor and the generator, of a resistor in the circuit of the field winding of the exciter and means dependent upon a condition of the motor and the generator for controlling the effectiveness of the resistor.

2. In a power distributing system, the combination with a synchronous motor, a direct-current generator to be driven thereby and an external source of electromotive force for energizing the field windings of both the motor and the generator, of means for controlling the effectiveness of said electromotive force upon the motor and generator windings, and means responsive to an abnormal condition of the motor or the generator for controlling said means.

3. In a distribution system, the combination with a motor and a generator respectively provided with a field winding, of a resistor in circuit with the field winding of the generator and means responsive to an abnormal condition of the field winding of the motor for controlling the effectiveness of the resistor.

4. In a distribution system, the combination with a synchronous motor and a generator respectively provided with a field winding, of a resistor in circuit with the field winding of the generator and means responsive to a predetermined slip of the motor for controlling the effectiveness of the resistor.

5. In a distribution system, the combination with a synchronous motor and a generator respectively provided with a field winding, of a resistor in circuit with the field winding of the generator and means energized only when the motor is operating at a speed other than synchronous speed for controlling the effectiveness of the resistor.

6. In a distribution system, the combination with a motor and a generator respectively provided with a field winding, of a resistor in circuit with the field winding of the generator and means energized by an electromotive force induced in the field winding of the motor by transformer action for controlling the effectiveness of the resistor.

7. The combination with a synchronous motor, a direct-current generator and means for connecting them between a supply and a load circuit, of means for controlling the voltage of the generator comprising a resistor in the circuit of the field winding of the generator, and means operative when the motor pulls out of step for rendering the resistor effective to reduce the generator voltage.

8. The combination with a generator provided with a shunt field winding, and a synchronous motor for driving the generator, of a resistor in the circuit of the generator shunt field winding, short-circuiting means for the resistor, and means for controlling the short-circuiting means comprising means responsive to non-synchronous operation of the motor and means responsive to the current traversing the generator.

9. The combination with a generator provided with a shunt field winding, and a synchronous motor for driving the generator, of a resistor in the circuit of the generator shunt field winding, short-circuiting means for the resistor, means responsive to non-synchronous operation of the motor for controlling the short-circuiting means to render the resistor effective, and means operative upon a decrease in the current traversing the generator to a predetermined value for controlling the short-circuiting means to render the resistor ineffective.

10. The combination with a synchronous motor-generator set, of means responsive to a predetermined abnormal armature reaction upon the field winding of the motor for controlling the excitation of the generator.

11. The combination with a synchronous motor-generator set, of means responsive to a predetermined abnormal armature reaction upon the field winding of the motor for controlling the effective resistance of the field winding of the generator.

12. The combination with a load circuit and a generator for supplying energy thereto, of means for controlling the generator to limit the translation of current to the circuit to a predetermined maximum value, and means responsive to the thermal condition of a generator winding for controlling said current-controlling means.

13. The combination with a load circuit and a generator for supplying energy thereto, of means for controlling the generator to limit the translation of current to the circuit to a predetermined maximum value, and means operative, when the temperature of a predetermined portion of the generator is less than a predetermined value, to modify the operation of the current-controlling means.

14. The combination with a load circuit and a generator for supplying energy thereto, of means for controlling the generator to limit the translation of current to the circuit to a predetermined maximum value, and means connected to a winding of the generator to control the operation of the current-controlling means.

15. The combination with a load circuit and a generator for supplying energy thereto, of means for controlling the generator to limit the translation of current to the circuit to a predetermined maximum value, comprising an operating winding and means for modifying the torque of said operating winding under predetermined temperature conditions in the generator.

16. The combination with a load circuit and a generator for supplying energy thereto, of means for controlling the generator to limit the translation of current to the circuit to a predetermined maximum value, comprising an operative winding and a second winding differentially effective relative thereto for controlling the effect thereof under predetermined conditions.

17. The combination with a generator for supplying current to a load circuit, of a regulator for controlling the voltage of the generator to limit the translation of current thereby to a predetermined value during normal operation and means for controlling the regulator to limit the translation of current to a greater value before the temperature of the generator attains a predetermined value.

18. The combination with a generator for supplying current to a load circuit, of a regulator for normally limiting the assumption of load by the generator to a predetermined value and for limiting such assumption to a different predetermined value under predetermined temperature conditions in the generator.

19. The combination with a generator for supplying current to a load circuit, of a regulator comprising means energized from the generator for controlling the generator to limit the assumption of load thereby to a predetermined value while the temperature thereof is less than a predetermined value, and to limit the assumption of load to a lower predetermined value when the temperature of the generator attains a predetermined value.

20. The combination with an electric circuit and a translating apparatus, of means for controlling the translation of energy therebetween comprising two differentially operative windings energized from the translating apparatus respectively in accordance with the current traversing, and the temperature of, a winding.

21. The combination with an electric circuit and a translating apparatus, of means for controlling the translation of energy therebetween comprising two differentially operative windings, and means for controlling the energization thereof respectively in accordance with the value of current traversing the windings of the apparatus and in accordance with the temperature of a predetermined portion of the apparatus.

22. The combination with a synchronous machine provided with a field winding, of means for detecting nonsynchronous operation of the machine comprising a current transformer in circuit with the field winding and an electro-responsive device connected to the secondary winding of the transformer, and means controlled by the electro-responsive device for causing the machine to resume synchronous operation.

23. The combination with a synchronous motor and a generator provided with a shunt field winding, of means responsive to non-synchronous operation of the motor for controlling the excitation of the generator field winding to reduce the load upon the generator until the motor can again accelerate to synchronous speed, and for then controlling the excitation of the generator to cause it to reassume the load.

24. The combination with a synchronous motor and a generator provided with a shunt field winding, of a relatively slowly regulatable resistor in circuit with the generator field winding, a relatively quickly regulatable resistor in said circuit, means for normally regulating the first-mentioned resistor to maintain normal current conditions and means responsive to abnormal conditions in either the motor or the generator for controlling both resistors.

25. The combination with a synchronous motor and a generator provided with a shunt field winding, of a variable resistor and a fixed resistor in circuit with the generator field winding, means normally operative for controlling the variable resistor comprising a current regulator energized in accordance with the load on the generator, and means operative under abnormal conditions for controlling the effectiveness of both resistors comprising means responsive to non-synchronous operation of the motor.

26. The combination with a synchronous motor and a generator, each being provided with a shunt field winding, of a variable resistor and a fixed resistor in circuit with the generator field winding, means normally operative for controlling the variable resistor comprising a current regulator energized in accordance with the load on the generator, and means operative under abnormal conditions for controlling the effectiveness of both resistors comprising means responsive to abnormal energization of the motor field winding, and means for rendering said controlling means ineffective until the motor and the generator have been connected to their respective circuits.

27. The combination with an alternating-current circuit, a direct-current circuit and a rotary transformer to be connected therebetween, of switching means for connecting the transformer to the respective circuits, means for controlling the energization of the switching means and means for controlling said controlling means upon the occurrence of abnormal conditions, to effect the disconnection of the transformer first from the direct-current circuit and then from the alternating-current circuit.

28. In an automatic station, the combination with an alternating-current circuit, a direct-current circuit and a rotary transformer to be connected therebetween, of switching devices to connect the transformer between the respective circuits, a source of control energy, a relay switch for connecting the alternating-current switch to the source of energy, a second relay switch in parallel therewith also connecting the alternating-current switch to the source of energy, means controlled by the direct-current switch for controlling said second relay switch and means responsive to a predetermined abnormal condition in the station for rendering the first-mentioned relay switch ineffective.

29. In an automatic station, the combination with an alternating-current circuit, a direct-current circuit and a rotary transformer to be connected therebetween, of a switch between the alternating-current circuit and the transformer, a second switch between the transformer and the direct-current circuit, a source of control energy, means for connecting the first-mentioned switch thereto, a second source of energy, means for connecting the second-mentioned switch thereto, means for controlling both connecting means, means for rendering said controlling means for the connecting means ineffective upon the occurrence of a predetermined condition in the station and means for delaying the disconnection by the first-mentioned switch until the second-mentioned switch has operated to disconnect the transformer from the direct-current circuit.

30. In an automatic station, the combination with an alternating-current circuit, a direct-current circuit and a rotary transformer to be connected therebetween, a switch between the alternating-current circuit and the transformer, a second switch between the transformer and the direct-current circuit, a source of control energy, means for connecting the first-mentioned switch thereto, supplemental means controlled by the second-mentioned switch for connecting the first-mentioned switch to the source of control energy, and means responsive to a predetermined condition for effecting the disconnection of the transformer from the two circuits by rendering the connecting means associated with the first-mentioned switch ineffective and by rendering the second-mentioned switch operative to control the supplemental switch.

31. In a power system, the combination with a generator provided with a shunt field winding and a rheostat in circuit therewith, of a fixed resistor also in circuit therewith, a regulator for controlling the rheostat in accordance with one predetermined electrical condition in the generator and means for controlling the rheostat and the resistor upon the occurrence of another predetermined condition in the generator.

32. In a power system, the combination with a generator provided with a shunt field winding and a rheostat in circuit therewith, of a fixed resistor also in circuit therewith, a regulator for controlling the rheostat in accordance with the load on the generator under a predetermined value, and means responsive to short-circuit conditions for controlling both the resistor and the rheostat.

33. In a power system, the combination with a generator provided with a shunt field winding and a rheostat in circuit therewith, of a fixed resistor also in circuit therewith, a regulator for controlling the rheostat in accordance with the load on the generator under a predetermined value, and means responsive to short-circuit conditions for rendering the resistor and the rheostat entirely effective in the circuit of the winding.

34. The combination with a synchronous dynamo-electric machine provided with a field-magnet winding, and a load for the machine, of means comprising a current transformer in circuit with the field-magnet winding for controlling the load on the machine.

35. The combination with a synchronous dynamo-electric machine provided with a field-magnet winding, and a load for the machine, of means comprising a current tranformer in circuit with the field-magnet winding for controlling the load on the machine when the machine ceases to operate synchronously.

36. The combination with a synchronous dynamo-electric machine provided with a field-magnet winding, of means comprising a current transformer in circuit with the field-magnet winding for controlling the operation of the machine when it ceases to operate synchronously to cause it to resume synchronous operation.

37. The combination with a synchronous dynamo-electric machine provided with a field-magnet winding, and a load for the machine, of means comprising a current transformer in circuit with the field-magnet winding and means controlled by the current transformer for reducing the load on the machine.

38. The combination with a synchronous dynamo-electric machine provided with a field-magnet winding, and a load for the machine, of means comprising a current transformer in circuit with the field-magnet winding and means controlled by the current transformer for reducing the load on the machine when it is operating non-synchronously.

39. The combination with a synchronous dynamo-electric machine provided with a field-magnet winding, and a load for the machine, of means comprising a current transformer in circuit with the field-magnet winding and means controlled by the current transformer for reducing the load on the machine when it is operating non-synchrochronously to cause it to operate synchronously.

In testimony whereof, I have hereunto subscribed my name this 21st day of May 1923.

CHARLES A. BUTCHER.